(12) United States Patent
Lu (10) Patent No.: US 9,774,710 B2
(45) Date of Patent: *Sep. 26, 2017

(54) SYSTEM AND METHOD FOR NETWORK PROTOCOL OFFLOADING IN VIRTUAL NETWORKS

(71) Applicant: Futurewei Technologies, Inc., Plano, TX (US)

(72) Inventor: Yunsong Lu, Mountain View, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/250,602

(22) Filed: Aug. 29, 2016

(65) Prior Publication Data

US 2016/0366253 A1    Dec. 15, 2016

Related U.S. Application Data

(63) Continuation of application No. 14/451,149, filed on Aug. 4, 2014, now Pat. No. 9,432,487.

(51) Int. Cl.

| H04L 12/26 | (2006.01) |
|---|---|
| H04L 12/28 | (2006.01) |
| H04L 29/08 | (2006.01) |
| H04L 29/06 | (2006.01) |
| H04L 12/931 | (2013.01) |
| H04L 12/46 | (2006.01) |

(52) U.S. Cl.
CPC .............. *H04L 69/30* (2013.01); *H04L 49/70* (2013.01); *H04L 67/10* (2013.01); *H04L 69/161* (2013.01); *H04L 12/4641* (2013.01)

(58) Field of Classification Search
CPC ....... H04L 69/30; H04L 69/161; H04L 67/10; H04L 49/70
USPC .................................................. 370/241–255
See application file for complete search history.

(56) References Cited

U.S. PATENT DOCUMENTS

| 2006/0045005 A1* | 3/2006 | Blackmore | H04L 1/0079 370/216 |
|---|---|---|---|
| 2006/0045099 A1* | 3/2006 | Chang | H04L 69/166 370/400 |
| 2006/0056405 A1* | 3/2006 | Chang | H04L 45/00 370/389 |
| 2006/0059242 A1* | 3/2006 | Blackmore | G06F 12/1081 709/211 |
| 2006/0059282 A1* | 3/2006 | Chaudhary | H04L 67/1097 710/100 |

(Continued)

*Primary Examiner* — Thai Hoang
(74) *Attorney, Agent, or Firm* — Slater Matsil, LLP (57) ABSTRACT

An embodiment method of network protocol offloading for a packet traveling along a path having a plurality of hops in a virtual network includes checking, for each of the plurality of hops, that a virtual receiver node is safe for network protocol offloading and, when safe, deferring a network protocol processing task, forwarding the packet to a next hop among the plurality of hops, executing the network protocol processing task at a first earliest hop along the path where the virtual receiver node is unsafe for network protocol offloading, and executing the network protocol processing task at a second earliest hop along the path where the virtual receiver node includes a physical network interface that is safe for network protocol offloading.

20 Claims, 8 Drawing Sheets

(56) References Cited

U.S. PATENT DOCUMENTS

2006/0075067 A1* 4/2006 Blackmore ............ H04L 69/16
709/217

* cited by examiner

SYSTEM AND METHOD FOR NETWORK PROTOCOL OFFLOADING IN VIRTUAL NETWORKS

This is a continuation application of U.S. application Ser. No. 14/451,149, entitled "System and Method for Network Protocol Offloading in Virtual Networks," which was filed on Aug. 4, 2014 and issued as U.S. Pat. No. 9,432,487 on Aug. 30, 2016, and which is hereby incorporated herein by reference.

TECHNICAL FIELD

The present invention relates generally to network protocol offloading, and, in particular embodiments, to a system and method for network protocol offloading in virtual networks.

BACKGROUND

A virtual network is a computing network having virtual network links. Virtual network links do not require a physical connection, although a given virtual network link can include a physical connection, either wired or wireless. Virtual networks are generally achieved through network virtualization protocols layered on top of a physical network. Examples of virtual networks include virtual local area networks (VLANs), virtual private networks (VPNs), and virtual private LAN service (VPLS). Virtual networks can include one or more physical nodes, each hosting one or more virtual nodes. For example, in a hypervisor, network traffic between multiple virtual machines (VMs) is routed through a virtual switch or a virtual router. Similar to physical networks, virtual networks generally include one or more virtual switches, and may also include physical switches and routers.

A virtual switch is a software component that creates virtual connectivity between virtual ports on VMs. The virtual switch simulates a physical switch, performing packet switching between virtual nodes. A virtual node generally includes one or more virtual network interface cards (NICs) and can be implemented within a VM. The virtual switch generally includes multiple virtual ports through which packets are routed among the various connected virtual nodes. Virtual switch creates virtual connectivity between virtual NICs through virtual ports.

SUMMARY OF THE INVENTION

An embodiment method of network protocol offloading for a packet traveling along a path having a plurality of hops in a virtual network includes checking, for each of the plurality of hops, that a virtual receiver node is safe for network protocol offloading. When the virtual receiver node is safe, the network protocol processing task is deferred. The packet is then forwarded to the next hop among the plurality of hops. When the packet reaches an earliest hop along the path where the virtual receiver node is unsafe for network protocol offloading, the network protocol processing task is executed. When the packet reaches an earliest hop along the path where the virtual receiver node includes a physical network interface, the network protocol processing task is executed.

An embodiment virtual node in a network includes a non-transitory memory storage comprising instructions and one or more processors in communication with the memory. The one or more processors execute the instructions for checking, for each of a plurality of hops along a path traveled by a packet through the network, that a virtual receiver node is safe for network protocol offloading and, when safe, deferring a network protocol processing task, forwarding the packet to a next hop among the plurality of hops, executing the network protocol processing task at a first earliest hop along the path where the virtual receiver node is unsafe for network protocol offloading, and executing the network protocol processing task at a second earliest hop along the path where the virtual receiver node includes a physical network interface that is safe for network protocol offloading.

An embodiment computing system for a virtual network includes a physical network interface, non-transitory memory, and a processor. The physical network interface is couplable to a physical network over which packets are transmittable and receivable. The physical network interface is configured to execute network protocol processing tasks for the packets. The non-transitory memory is coupled to the physical network interface and is configured to store the packets. The processor is coupled to the physical network interface and the non-transitory memory. The processor has a virtual switch module configured to check, for each of a plurality of hops along a path traveled by a packet through the virtual network, that a virtual receiver node is safe for network protocol offloading and, when safe, deferring a network protocol processing task, forward the packet to a next hop among the plurality of hops, execute the network protocol processing task at a first earliest hop along the path where the virtual receiver node is unsafe for network protocol offloading, and execute the network protocol processing task at a second earliest hop along the path where the virtual receiver node includes a physical network interface that is safe for network protocol offloading.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Network protocol offloading is a feature of many physical networks that allows a physical source node to offload network protocol processing tasks to a physical network interface, such as a physical NIC. Generally, the physical source node is a software module operating within a processor, e.g., a central processing unit (CPU). Rather than utilizing processor resources to execute the network protocol processing tasks, the network protocol processing tasks are executed on the physical network interface. The physical network interface typically includes a dedicated processor for carrying out the network protocol processing tasks. Network protocol processing tasks that can be offloaded on the transmission side to the physical network interface include large send offload (LSO), transmit control protocol (TCP) segmentation, user datagram protocol/internet protocol (UDP/IP) fragmentation, checksum calculation, hashing, header insertion, and multicasting, among others. Network protocol processing tasks that can be offloaded on the receiving side include large receive offload (LRO), checksum verification, hashing, header separation/replacing, and multicasting, among others. Generally, network protocols that can be offloaded include TCP/UDP protocol stacks and IP stacks, among others.

In a virtual network, packets routed between two virtual nodes do not necessarily encounter a physical network interface that includes network protocol offloading compatible, i.e., safe, hardware. Consequently, network protocol offloading is typically disabled for virtual networks. Without network protocol offloading, the network protocol processing tasks are carried out by the processor as opposed to by the physical network interface. This results in inefficient resource allocation for network protocol offloading safe virtual nodes. A virtual node is considered safe for network protocol offloading if that node is running network protocol offloading safe software, running within a network protocol offloading safe operating system (OS), or includes network protocol offloading safe hardware. A software module is considered network protocol offloading safe if packets can be safely transmitted and received without carrying out the network protocol processing tasks. For example, consider a network protocol that enforces a standard packet format, if a software module executing at a virtual node can safely transmit and receive packets that do not meet the standard packet format, then the software module is safe for network protocol offloading. The particular parameter that makes a virtual node safe or unsafe for network protocol offloading can vary per OS and per application.

It is realized herein that network protocol offloading can be used in virtual networks. It is realized herein that each hop a packet makes through a virtual network can be evaluated for network protocol offloading safety and the network protocol processing task deferred until the earliest hop where the virtual receiver node is unsafe for network protocol offloading or includes a physical interface in its path. It is further realized herein that when no unsafe virtual nodes exist in a packet's path, the offloaded network protocol processing tasks are deferred indefinitely.

Figure 1:
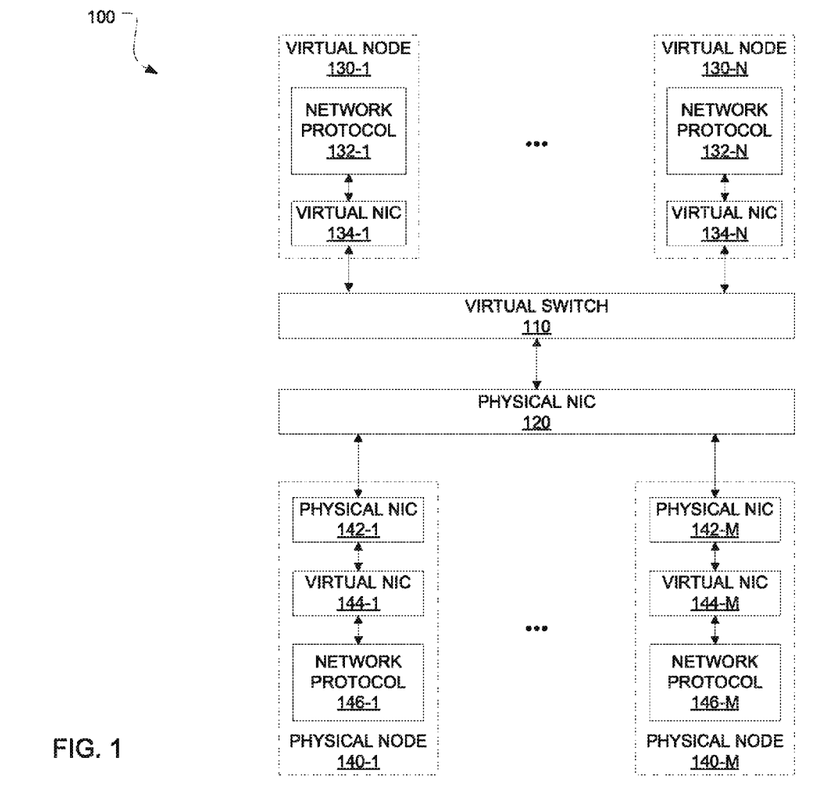
FIG. 1 is a block diagram of one embodiment of a virtual network.

FIG. 1 is a block diagram of one embodiment of a virtual network 100. Virtual network 100 includes N virtual nodes and M physical nodes, all coupled via a virtual switch 110. The N virtual nodes, virtual node 130-1 through 130-N, couple directly to virtual switch 110. The M physical nodes, physical node 140-1 through 140-M couple to virtual network 100 through a physical NIC 120. Physical NIC 120 couples to virtual switch 110 through a virtual port. Furthermore, physical nodes 140-1 through 140-M can couple to physical NIC 120 directly or can couple through a switching device, such as a physical switch.

Virtual nodes 130-1 through virtual node 130-N include respective virtual NICs 134-1 through 134-N and respective network protocols 132-1 through 132-N. Network protocols 132-1 through 130-N can be any network protocol, including an IP stack, a TCP/UDP stack, or any portion of those network protocols. For example, network protocol 132-1 can be a process such as TCP segmentation or UDP/IP fragmentation. Other network protocol processes include checksum calculation, hashing, header insertion, multicasting, checksum verification, and header separation and replacing. Virtual nodes 130-1 through 130-N lack physical network interfaces that include processors that can perform offloaded network protocol processing tasks from respective network protocols 132-1 through 132-N. A typical solution is to forgo network protocol offloading where no network protocol offloading capability exists in a path between a virtual source node and a virtual receiver node, otherwise referred to as being unsafe for network protocol offloading. In certain embodiments, although no network protocol offloading compatible hardware exists in the path, a network protocol offloading compatible software can bridge the virtual source node and the virtual receiver node.

Physical nodes 140-1 through 140-M include respective physical NICs 142-1 through 142-M, respective virtual NICs 144-1 through 144-M, and respective network protocols 146-1 through 146-M. Each of the M physical nodes is also a virtual node in virtual network 100, although each physical node's connection to virtual network 100 includes a physical connection to virtual switch 110 through physical NIC 120. The respective physical NICs 142-1 through 142-M handle the physical portion of the virtual network interface. The respective virtual NICs 144-1 through 144-M handle the interface with the virtual switch and the N virtual nodes in virtual network 100. When physical network interface hardware exists in the path, and the hardware is network protocol offloading compatible, which is otherwise referred to as network protocol offloading safe, the offloaded network protocol processing task is executed by the physical network interface hardware.

When a packet originates at a virtual node of the N virtual nodes, regardless of whether the packet's final destination is a virtual node or a physical node, the packet can take several hops among all of the N+M virtual nodes to reach that destination. A given packet's path can include a mix of virtual nodes 130-1 through 130-N and physical nodes 140-1 through 140-N, can include only virtual nodes of the N virtual nodes, or can include only physical nodes of the M physical nodes.

Figure 2:
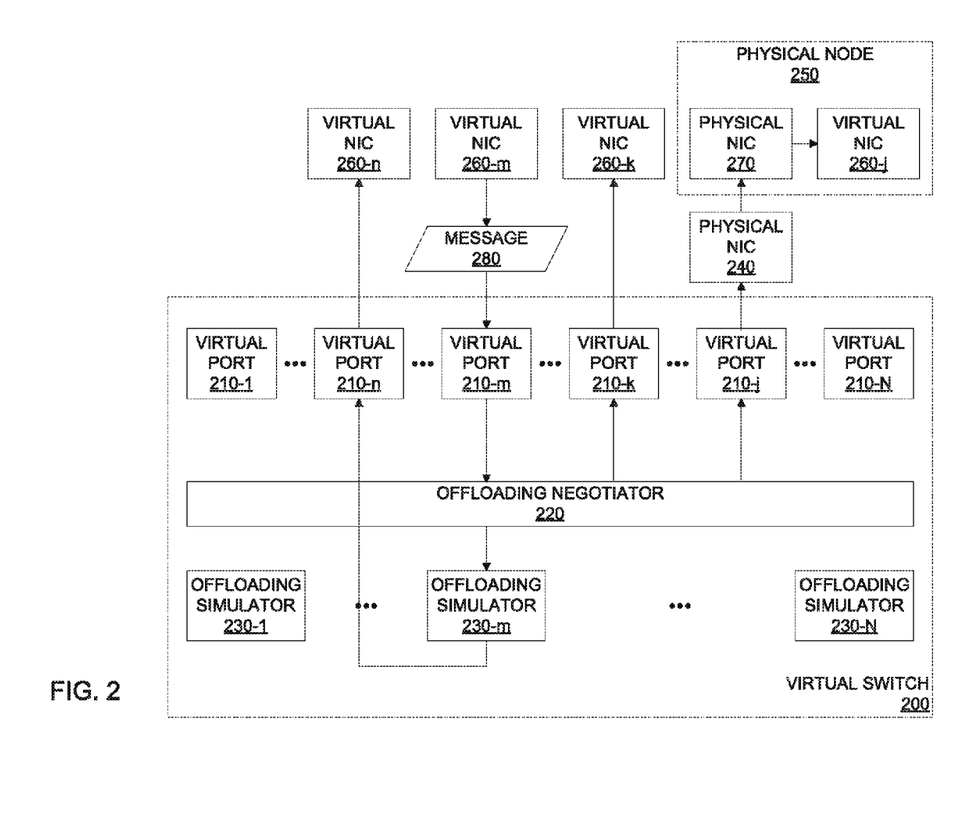
FIG. 2 is a block diagram of one embodiment of a virtual switch.

FIG. 2 is a block diagram of one embodiment of a virtual switch 200. Virtual switch 200 includes N virtual ports, an offloading negotiator 220, and N offloading simulators. The N virtual ports include virtual port 210-1, 210-$n$, 210-$m$, 210-$k$, 210-$j$, and on through 210-N. Similarly, the N offloading simulators include offloading simulator 230-1, 230-$m$, and on through 230-N. The N virtual ports are the interface through which virtual switch 200 couples to virtual nodes and, more specifically, to virtual NICs. A virtual NIC 260-$n$ is coupled to virtual port 210-$n$, a virtual NIC 260-$m$ is coupled to virtual port 210-$m$, a virtual NIC 260-$k$ is coupled to virtual port 210-$k$, and a physical node 250 is coupled to virtual port 210-$j$. Physical node 250 is also a virtual node and includes a physical NIC 270 and a virtual NIC 260-$j$. The physical connection between physical node 250 and virtual switch 200 is through a physical NIC 240. Physical NIC 240 and physical NIC 270 manage the physical interface, while virtual NIC 260-$j$ handles the interface with virtual switch 200 through virtual port 210-$j$.

As a message 280, e.g., a packet, travels along its path through the virtual network formed by virtual switch 200 and the various virtual nodes, offloading negotiator 220 determines whether network protocol processing tasks should be executed or deferred at each hop. For example, message 280 is received by virtual switch 200 at virtual port 210-*m* from virtual NIC 260-*m*. If message 280 is destined for physical node 250, offloading negotiator determines whether the path, or hop, from virtual NIC 260-*m* to virtual NIC 260-*j* is safe for network protocol offloading. In that path are physical NIC 240 and physical NIC 270, which include network protocol offloading compatible hardware. Offloading negotiator 220 determines that the network protocol processing tasks should be offloaded from virtual NIC 260-*m* and deferred to physical NIC 240. At physical NIC 240, the offloaded network protocol processing tasks from virtual NIC 260-*m*, as well as any deferred tasks from previous hops, are executed and the packet is transmitted over the physical interface to physical NIC 270 and physical node 250. The packet is then delivered to virtual NIC 260-*j*. This path is akin to network protocol offloading in a typical physical network, where a physical interface exists between each node.

In another example, message 280 is destined for virtual NIC 260-*k*. Offloading negotiator 220 is configured to determine whether the path from virtual NIC 260-*m* to virtual NIC 260-*k* is safe for network protocol offloading. Although no physical interface exists between virtual NIC 260-*m* and virtual NIC 260-*k*, the virtual receiver node using virtual NIC 260-*k* is executing network protocol offloading compatible software, making the path safe for network protocol offloading. Offloading negotiator forwards message 280 directly from virtual port 210-*m* to virtual port 210-*k* and on to virtual NIC 260-*k*. Offloading negotiator also defers the network protocol processing tasks offloaded from virtual NIC 260-*m*. The network protocol processing tasks are deferred until, on a later hop, message 280 reaches a virtual node that is unsafe for network protocol offloading or a physical node.

In yet another example, message 280 is destined for virtual NIC 260-*n*. Offloading negotiator 220 is configured to determine whether the path from virtual NIC 260-*m* to virtual NIC 260-*n* is safe for network protocol offloading. No physical interface exists between virtual NIC 260-*m* and virtual NIC 260-*n* and, additionally, virtual NIC 260-*n* and its corresponding virtual node are not compatible with network protocol offloading. Offloading negotiator 220 makes the determination and passes message 280 to offloading simulator 230-*m*. Offloading simulator 230-*m* is configured to emulate network protocol offloading compatible hardware and execute offloaded network protocol processing tasks, including network protocol processing tasks offloaded from virtual NIC 260-*m* and any deferred tasks from previous hops. Message 280 is then delivered to virtual NIC 260-*n* through virtual port 210-*n*.

Figure 3:
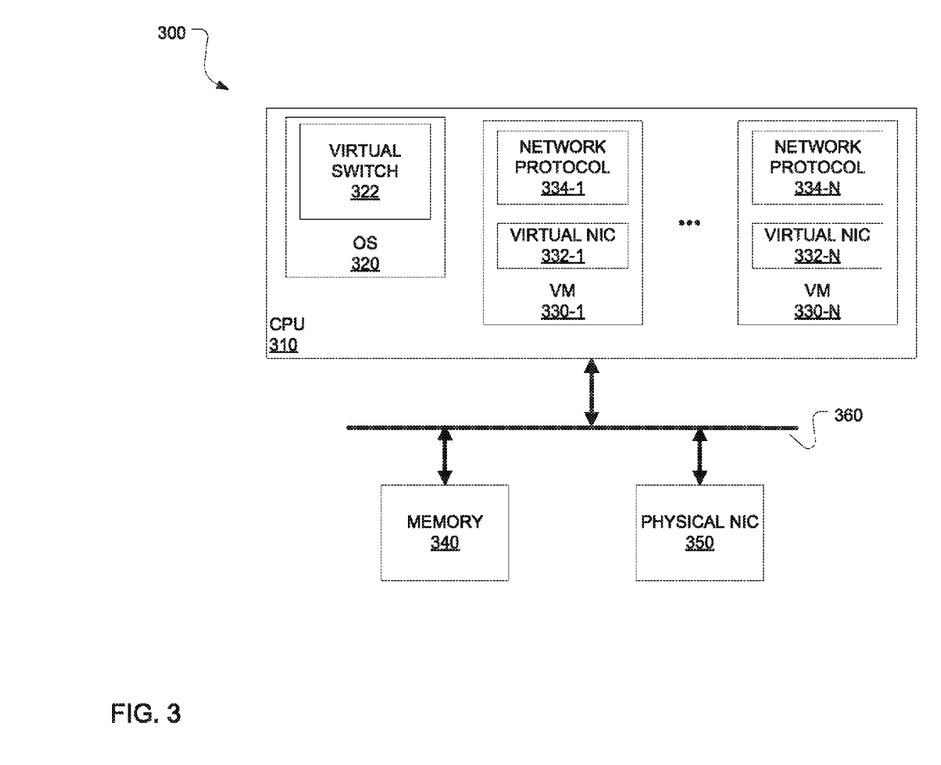
FIG. 3 is a block diagram of one embodiment of a computing system.

FIG. 3 is a block diagram of one embodiment of a computing system 300. Computing system 300 includes a CPU 310 coupled to memory 340 and a physical NIC 350 by a bus 360. Physical NIC 350 includes network protocol offloading compatible hardware for processing network protocol processing tasks. Additionally, physical NIC 350 couples computing system 300 to a physical network over which physical NIC 350 is configured to transmit and receive packets. Memory 340 is non-transitory memory configured to store received packets and those waiting to be transmitted. Memory 340 is further configured to store program instructions to be carried out by CPU 310. CPU 310 is configured to execute an OS 320 and N VMs, VM 330-1 through VM 330-N. Program instructions for OS 320 and the N VMs can be stored in memory 340 and accessed by CPU 310 through bus 360. CPU 310 is further configured to execute a virtual switch module 322 within OS 320. Each of VMs 330-1 through 330-N represent a virtual node in a virtual network. The virtual nodes are coupled to virtual switch 322 through respective virtual NICs 332-1 through 332-N. Additional virtual nodes can couple to virtual switch 322 and the virtual network through physical NIC 350. VMs 330-1 through 330-N also include respective network protocols 334-1 through 334-N.

In alternative embodiments, OS 320 and VMs 330-1 through 330-N can be implemented in one or more processors, one or more application specific integrated circuits (ASICs), one or more field-programmable gate arrays (FPGAs), dedicated logic circuitry, or any combination thereof, all collectively referred to as a processor. The respective functions for OS 320 and VMs 330-1 through 330-N can be stored as instructions in non-transitory memory for execution by the processor.

Figure 4:
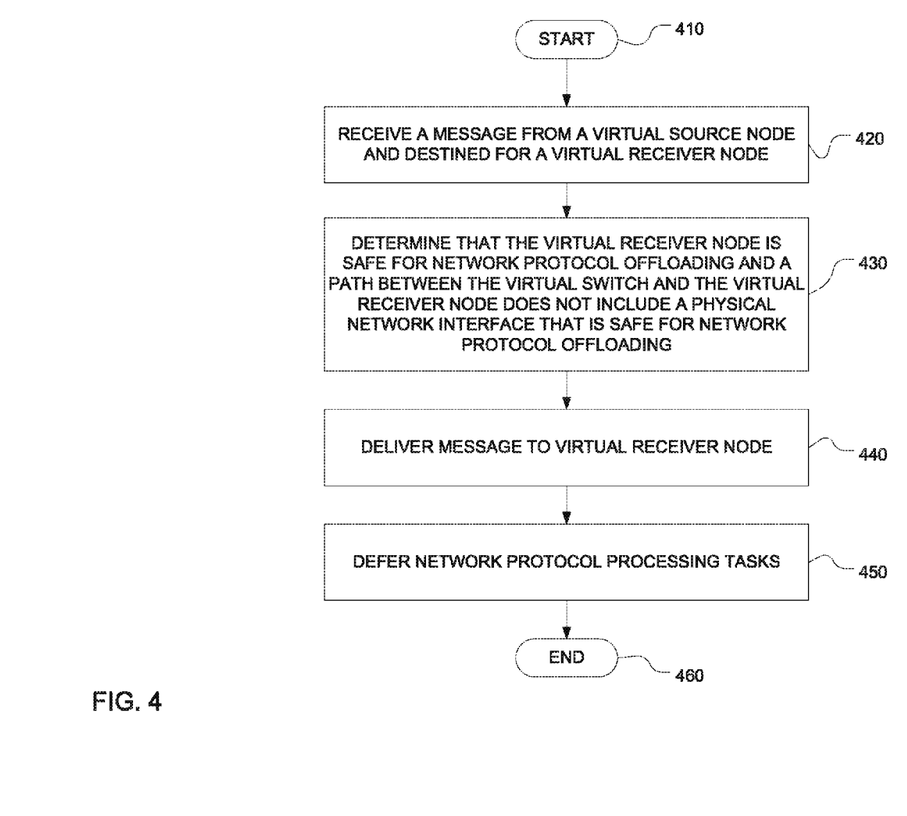
FIG. 4 is a flow diagram of one embodiment of a method of deferred network protocol offloading in a virtual network.

FIG. 4 is a flow diagram of one embodiment of a method of deferred network protocol offloading in a virtual network. The method begins at a start step 410. At a receive step 420, a virtual switch receives a message from a virtual source node. The virtual source node generally includes a virtual NIC that virtually connects to a virtual port on the virtual switch. Network protocol processing tasks for the message are offloaded from the virtual source node. The message is destined for a virtual receiver node. The virtual receiver node also includes a virtual NIC that virtually connects to another virtual port on the virtual switch. The virtual connection between the virtual receiver node and the virtual switch can be entirely virtual or can include a physical connection, which can be either a wired or wireless connection.

At an offloading negotiation step 430, a determination is made that the virtual receiver node is safe for network protocol offloading. A determination is also made that a path between the virtual switch and the virtual receiver node does not include a physical network interface that is safe for network protocol offloading. The virtual receiver node can include network protocol offloading safe software or can include network protocol offloading safe hardware to make it safe. The determination is made according to configuration information for the virtual receiver node that is available to the virtual switch at offloading negotiation step 430.

Given that the virtual receiver node is safe for network protocol offloading, the message is delivered to the virtual receiver node by the virtual switch at a forwarding step 440. The network protocol processing tasks offloaded from the virtual source node are deferred at a deferral step 450. In certain embodiments, the virtual receiver node is the final destination for the message and the network protocol processing tasks are deferred indefinitely. This occurs when the virtual receiver node is the first and only hop for the message. Alternatively, this can occur when the virtual receiver node is the last hop of many for the message. In the latter case, the offloaded network protocol processing tasks had been deferred at each hop until reaching the final virtual receiver node, where the network protocol processing tasks are deferred indefinitely. In other embodiments, the message is bound for another virtual node and the virtual receiver node relays the message. In those embodiments, the deferred network protocol processing tasks continue to be deferred until the earliest unsafe virtual receiver node is encountered or a physical network interface is encountered. The method then ends at an end step 460.

Figure 5:
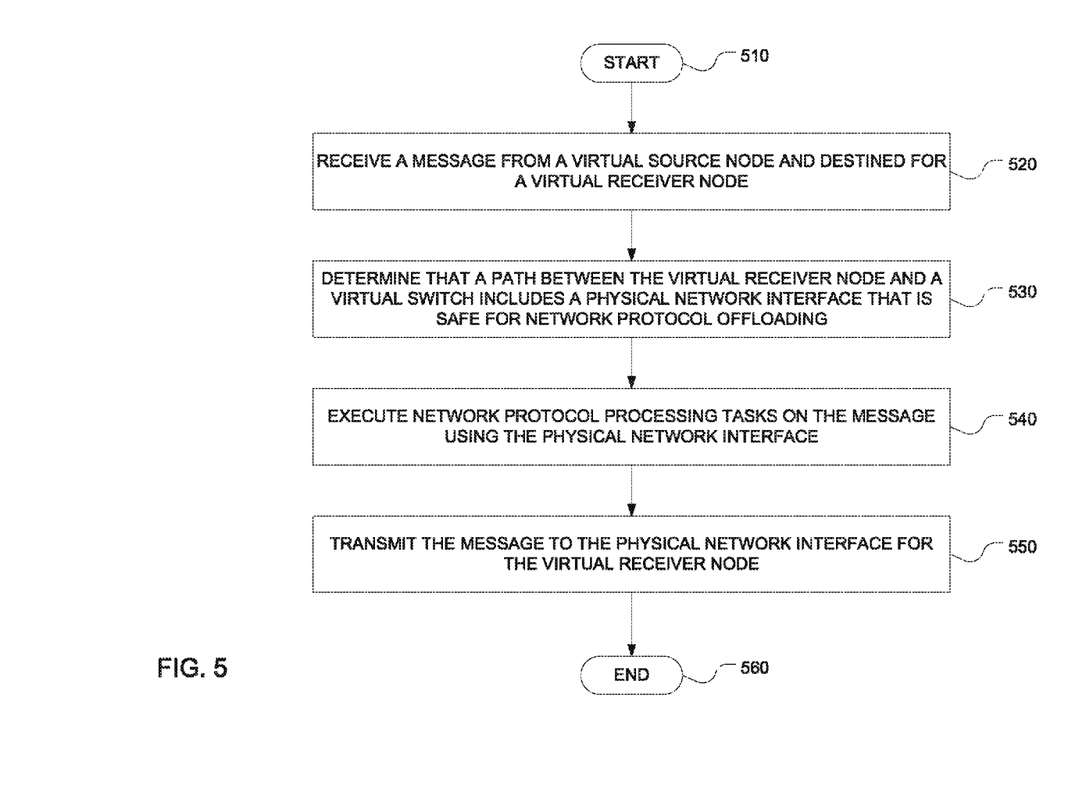
FIG. 5 is a flow diagram of another embodiment of a method of deferred network protocol offloading in a virtual network.

FIG. 5 is a flow diagram of another embodiment of a method of deferred network protocol offloading in a virtual network. The method begins at a start step 510. At a receive step 520, a virtual switch receives a message from a virtual source node. The virtual source node generally includes a virtual NIC that virtually connects to a virtual port on the virtual switch. Network protocol processing tasks for the message are offloaded from the virtual source node. The message is destined for a virtual receiver node. The virtual receiver node also includes a virtual NIC that virtually connects to another virtual port on the virtual switch. The virtual connection between the virtual receiver node and the virtual switch can be entirely virtual or can include a physical connection.

At an offloading negotiation step 530, a determination is made that a path between the virtual receiver node and the virtual switch includes a physical network interface that is safe for network protocol offloading. The physical network interface includes network protocol offloading safe hardware, making the virtual receiver node safe for network protocol offloading. Additionally, in certain embodiments, the virtual receiver node can also include network protocol offloading safe software. The determination is made according to configuration information for the virtual receiver node that is available to the virtual switch at offloading negotiation step 530.

Given that the virtual receiver node is safe for network protocol offloading and the path includes a physical network interface, the offloaded network protocol processing tasks are deferred until the message reaches the physical network interface, at which point they are executed at an execution step 540. The deferred network protocol processing tasks can be executed at a physical network interface local to the virtual switch. For example, a computing system hosting the virtual switch also includes a NIC as its physical network interface. The virtual switch forwards the message to the NIC, where the deferred network protocol processing tasks are executed. In alternative embodiments, the deferred network protocol processing tasks can be executed at a physical network interface local to the virtual receiver node. At a transmission step 550, the physical network interface for the virtual switch transmits the message to the physical node over the physical connection to the physical network interface for the physical node. In certain embodiments, the virtual receiver node is the final destination for the message. This occurs when the virtual receiver node is the first and only hop for the message. Alternatively, this can occur when the virtual receiver node is the last hop of many for the message. In the latter case, the offloaded network protocol processing tasks had been deferred at each hop until reaching the final virtual receiver node, where they are executed by the physical network interface. In other embodiments, the message is bound for another virtual node and the virtual receiver node relays the message. In those embodiments, the network protocol processing tasks have already been executed; therefore the subsequent virtual receiver nodes need not be safe for network protocol offloading. The method then ends at an end step 460.

Figure 6:
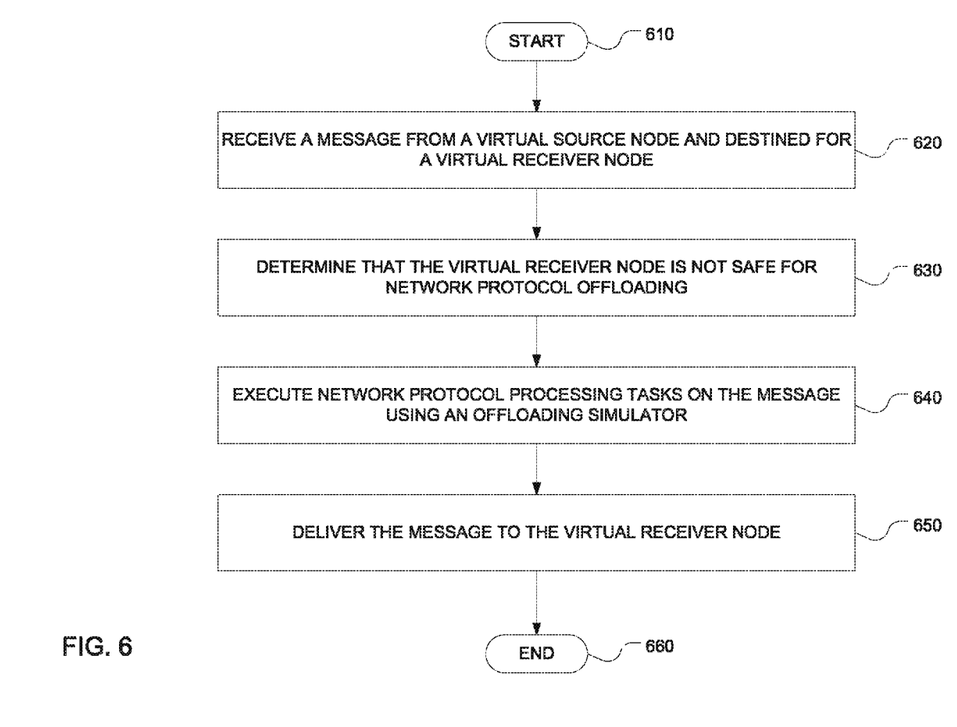
FIG. 6 is a flow diagram of yet another embodiment of a method of deferred network protocol offloading in a virtual network.

FIG. 6 is a flow diagram of yet another embodiment of a method of deferred network protocol offloading in a virtual network. The method begins at a start step 610. At a receive step 620, a virtual switch receives a message from a virtual source node. The virtual source node generally includes a virtual NIC that virtually connects to a virtual port on the virtual switch. Network protocol processing tasks for the message are offloaded from the virtual source node. The message is destined for a virtual receiver node. The virtual receiver node also includes a virtual NIC that virtually connects to another virtual port on the virtual switch. The virtual connection between the virtual receiver node and the virtual switch can be entirely virtual or can include a physical connection.

At an offloading negotiation step 630, a determination is made that the virtual receiver node is not safe for network protocol offloading. The determination is made according to configuration information for the virtual receiver node that is available to the virtual switch at offloading negotiation step 630. The configuration information indicates the virtual receiver node lacks hardware that is network protocol offloading safe, and lacks software that is network protocol offloading safe. The offloaded network protocol processing tasks are executed by the virtual switch at an execution step 640. The virtual switch includes an offloading simulator that emulates a physical network interface that is network protocol offloading safe. The offloading simulator is a module within the processor implementing the virtual switch and is configured to execute network protocol tasks. The message is then forwarded to the virtual receiver node at a forwarding step 650.

In certain embodiments, the virtual receiver node is the final hop for the message, which can occur when the virtual receiver node is the first and only hop, or when the virtual receiver node is the last of many hops for the message. Alternatively, the virtual receiver node can be an intermediate hop and will relay the message to subsequent virtual nodes. Given that the virtual receiver node is unsafe for network protocol offloading and the offloaded network protocol processing tasks are executed at the virtual switch by the offloading simulator, no additional offloaded network protocol processing tasks are executed at subsequent hops. The method then ends at an end step 660.

Figure 7:
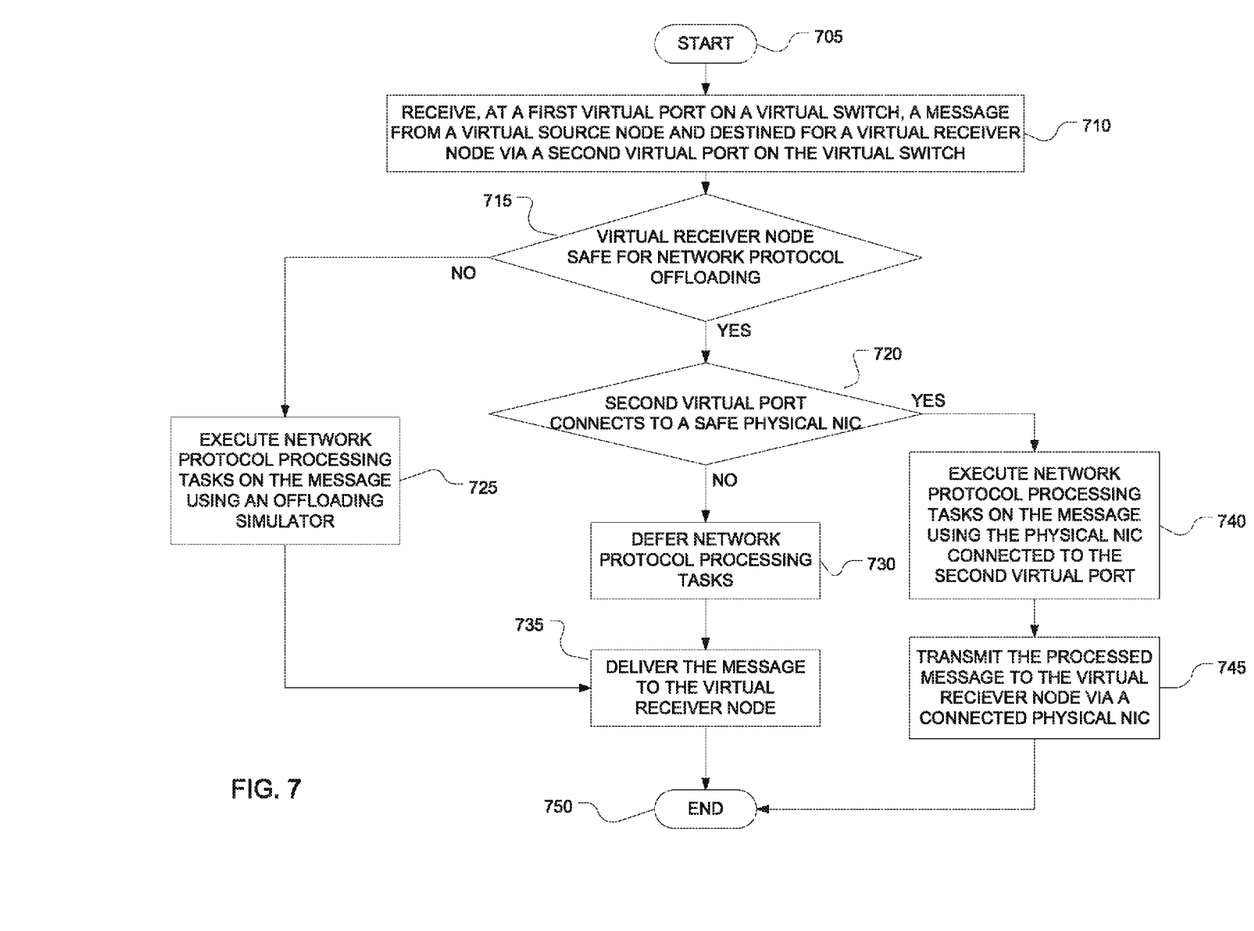
FIG. 7 is a flow diagram of one embodiment of a method of network protocol offloading in a virtual network.

FIG. 7 is a flow diagram of one embodiment of a method of network protocol offloading in a virtual network. The method begins at a start step 705. A message is received at a receive step 710. The message is received by a virtual switch module within a processor, i.e., a CPU. More specifically, the message is received at a first virtual port on the virtual switch module. The message originated at a virtual source node that offloaded network protocol processing tasks. The message is destined for a virtual receiver node via a second virtual port on the virtual switch module. The virtual receiver node can be a virtual node only, or can be a physical node as well as a virtual node. If the virtual receiver node is a physical node, then the second virtual port connects to a physical NIC, which can transmit the message to another physical NIC for the virtual receiver node. If the virtual receiver node is a virtual node only, it lacks hardware necessary to execute offloaded network protocol processing tasks. However, the virtual receiver node can still be safe for network protocol offloading if it is also running software that is network protocol offloading safe. Network protocol offloading safe software can be an OS, or a software module running within a VM that represents the virtual receiver node. If the virtual receiver node lacks the network protocol offloading safe software, then it is considered unsafe.

At a negotiation step 715, the virtual switch module determines whether the virtual receiver node is safe for network protocol offloading. When the virtual receiver node is unsafe, the method proceeds to an offloading simulation step 725. Otherwise, the method proceeds to a checking step 720. At offloading simulation step 725, the network protocol processing tasks offloaded from the virtual source node are executed by the virtual switch module. The virtual switch also executes any network protocol processing tasks deferred from preceding hops. The message is then delivered to the virtual receiver node at a delivering step 735. The message is then safe for any subsequent hops to virtual nodes, whether the virtual nodes are safe for network protocol offloading or not.

When the virtual receiver node is safe for network protocol offloading, the virtual switch determines whether the path between the virtual switch and the virtual receiver node includes a physical network interface that is safe for network protocol offloading at checking step 720. When the path includes a physical network interface, the second virtual port, i.e., the outbound port, on the virtual switch module is connected to a physical NIC. The physical NIC may or may not be safe for network protocol offloading. The virtual receiver node would also be connected to a physical NIC that may or may not be safe for network protocol offloading. When a physical network interface is present at the virtual receiver node, the method proceeds to an execution step 740. Otherwise, in certain embodiments, the offloaded network protocol processing tasks are deferred at a deferral step 730. At execution step 740, the offloaded network protocol processing tasks are executed by the physical NIC connected to the second virtual port, i.e., the outbound virtual port, of the virtual switch. The offloaded network protocol processing tasks can include those offloaded by the virtual source node, as well as any network protocol processing tasks deferred from previous hops. The physical NIC connected to the second virtual port is then used at a transmission step 745 to transmit the processed message to the physical receiver node via a physical connection to the physical NIC for the physical receiver node. The physical connection can be a wired or wireless connection.

When the virtual receiver node is safe for network protocol offloading, but does not include a safe physical network interface, the method proceeds to deferral step 730. At deferral step 730, the network protocol processing steps offloaded by the virtual source node, as well as any network protocol processing tasks deferred from previous hops, are deferred until the earliest hop where the virtual receiver node is unsafe or includes a physical network interface. The message is then delivered to the virtual receiver node at delivering step 735. The method then ends at an end step 750.

Figure 8:
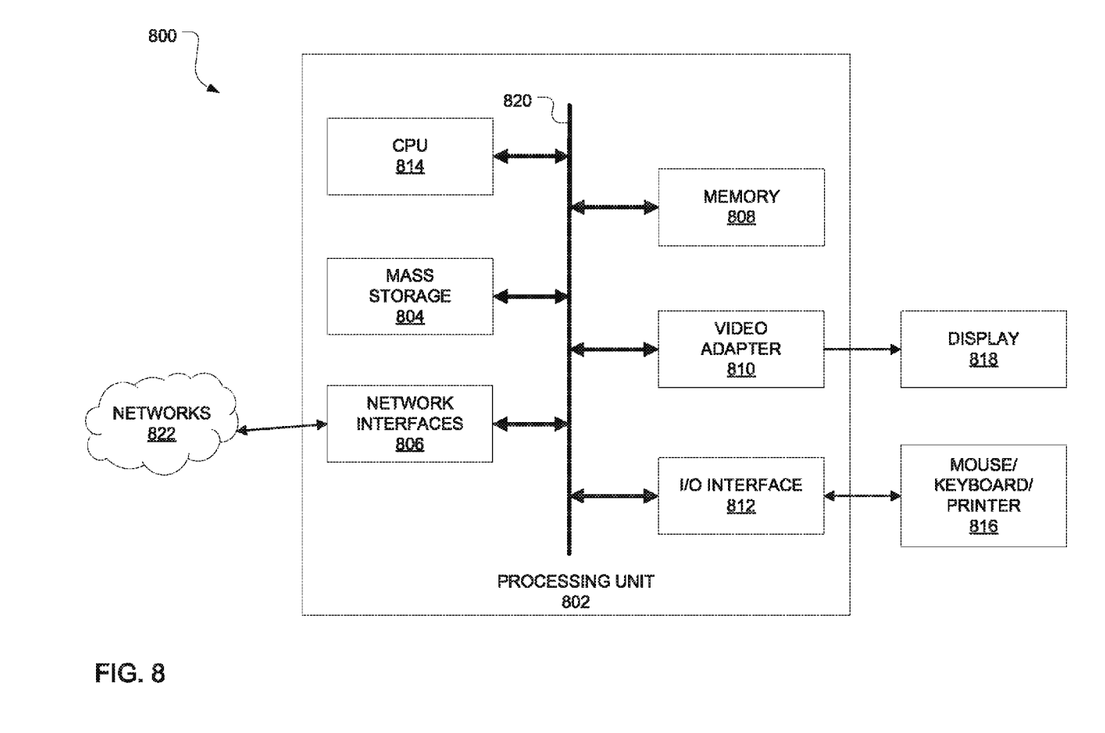
FIG. 8 is a block diagram of a computing system.

FIG. 8 is a block diagram of a computing system 800 that may be used for implementing the devices and methods disclosed herein. Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 800 may comprise a processing unit 802 equipped with one or more input/output devices, such as a speaker, microphone, mouse, touchscreen, keypad, keyboard, printer, display, and the like. The processing unit may include a central processing unit (CPU) 814, memory 808, a mass storage device 804, a video adapter 810, and an I/O interface 812 connected to a bus 820.

The bus 820 may be one or more of any type of several bus architectures including a memory bus or memory controller, a peripheral bus, video bus, or the like. The CPU 814 may comprise any type of electronic data processor. The memory 808 may comprise any type of system memory such as static random access memory (SRAM), dynamic random access memory (DRAM), synchronous DRAM (SDRAM), read-only memory (ROM), a combination thereof, or the like. In an embodiment, the memory 808 may include ROM for use at boot-up, and DRAM for program and data storage for use while executing programs.

The mass storage 804 may comprise any type of storage device configured to store data, programs, and other information and to make the data, programs, and other information accessible via the bus 820. The mass storage 804 may comprise, for example, one or more of a solid state drive, hard disk drive, a magnetic disk drive, an optical disk drive, or the like.

The video adapter 810 and the I/O interface 812 provide interfaces to couple external input and output devices to the processing unit 802. As illustrated, examples of input and output devices include a display 818 coupled to the video adapter 810 and a mouse/keyboard/printer 816 coupled to the I/O interface 812. Other devices may be coupled to the processing unit 802, and additional or fewer interface cards may be utilized. For example, a serial interface such as Universal Serial Bus (USB) (not shown) may be used to provide an interface for a printer.

The processing unit 802 also includes one or more network interfaces 806, which may comprise wired links, such as an Ethernet cable or the like, and/or wireless links to access nodes or different networks. The network interfaces 806 allow the processing unit 802 to communicate with remote units via the networks. For example, the network interfaces 806 may provide wireless communication via one or more transmitters/transmit antennas and one or more receivers/receive antennas. In an embodiment, the processing unit 802 is coupled to a local-area network 822 or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of network protocol offloading for a packet traveling along a path having a plurality of hops in a virtual network, the method comprising:
   checking, for each of the plurality of hops, that a virtual receiver node is safe for network protocol offloading and determining, for each hop of the plurality of hops that has a virtual receiver node, whether it is safe or unsafe to defer a network protocol processing task at the virtual receiver node;
   forwarding the packet to a next hop among the plurality of hops;
   performing the network protocol processing task at a first earliest hop along the path relative to the next hop where the virtual receiver node of the first earliest hop is unsafe for network protocol offloading; and
   performing the network protocol processing task at a second earliest hop along the path relative to the next hop where the virtual receiver node of the second earliest hop includes a physical network interface that is safe for network protocol offloading.

2. The method of claim 1 wherein executing the network protocol processing task includes processing an internet protocol (IP) stack for the packet.

3. The method of claim 1 wherein the checking includes determining whether respective virtual receiver nodes for the plurality of hops are executing network protocol offloading compatible software.

4. The method of claim 1 wherein the checking includes determining whether respective virtual receiver nodes for the plurality of hops include network protocol offloading compatible hardware.

5. The method of claim 1 wherein all respective virtual receiver nodes for the plurality of hops are safe for network protocol offloading.

6. The method of claim 5 wherein deferring the network protocol processing task comprises omitting the network protocol processing task for the packet.

7. A virtual node in a network, the virtual node comprising:
a non-transitory memory storage comprising instructions; and
one or more processors in communication with the memory, wherein the one or more processors execute the instructions for:
checking, for each of a plurality of hops along a path traveled by a packet through the network, that a virtual receiver node is safe for network protocol offloading and determining, for each hop of the plurality of hops that has a virtual receiver node, whether it is safe or unsafe to defer a network protocol processing task at the virtual receiver node;
forwarding the packet to a next hop among the plurality of hops;
performing the network protocol processing task at a first earliest hop along the path relative to the next hop where the virtual receiver node of the first earliest hop is unsafe for network protocol offloading; and
performing the network protocol processing task at a second earliest hop along the path relative to the next hop where the virtual receiver node of the second earliest hop includes a physical network interface that is safe for network protocol offloading.

8. The virtual node of claim 7 wherein executing the network protocol processing task includes processing an internet protocol (IP) stack for the packet.

9. The virtual node of claim 7 wherein the checking includes determining whether respective virtual receiver nodes for the plurality of hops are executing network protocol offloading compatible software.

10. The virtual node of claim 7 wherein the checking includes determining whether respective virtual receiver nodes for the plurality of hops include network protocol offloading compatible hardware.

11. The virtual node of claim 7 wherein all respective virtual receiver nodes for the plurality of hops are safe for network protocol offloading.

12. The virtual node of claim 11 wherein deferring the network protocol processing task comprises omitting the network protocol processing task for the packet.

13. A computing system for a virtual network, comprising:
a physical network interface coupled to a physical network over which packets are transmittable and receivable, and configured to execute network protocol processing tasks for the packets;
a non-transitory memory coupled to the physical network interface and configured to store the packets; and
a processor coupled to the physical network interface and the non-transitory memory, and having a virtual switch module configured to:
check, for each of a plurality of hops along a path traveled by a packet through the virtual network, that a virtual receiver node is safe for network protocol offloading and determining, for each hop of the plurality of hops that has a virtual receiver node, whether it is safe or unsafe to defer a network protocol processing task at the virtual receiver node;
forward the packet to a next hop among the plurality of hops;
perform the network protocol processing task at a first earliest hop along the path relative to the next hop where the virtual receiver node of the first earliest hop is unsafe for network protocol offloading; and
execute the network protocol processing task at a second earliest hop along the path relative to the next hop where the virtual receiver node of the second earliest hop includes a physical network interface that is safe for network protocol offloading.

14. The computing system of claim 13 wherein executing the network protocol processing task includes processing an internet protocol (IP) stack for the packet.

15. The computing system of claim 13 wherein the checking includes determining whether respective virtual receiver nodes for the plurality of hops are executing network protocol offloading compatible software.

16. The computing system of claim 13 wherein the checking includes determining whether respective virtual receiver nodes for the plurality of hops include network protocol offloading compatible hardware.

17. The computing system of claim 13 wherein all respective virtual receiver nodes for the plurality of hops are safe for network protocol offloading.

18. The computing system of claim 17 wherein deferring the network protocol processing task comprises omitting the network protocol processing task for the packet.

19. The computing system of claim 13 wherein the virtual receiver node comprises a virtual network interface card (NIC) having a configuration indicative of the virtual receiver node's compatibility with network protocol offloading.

20. The computing system of claim 13 wherein the processor is configured to execute a plurality of virtual node processes, each having a virtual network interface card (NIC) coupled to the virtual switch module, thereby forming at least a portion of the virtual network.

* * * * *